United States Patent [19]

Moore

[11] Patent Number: 4,506,314
[45] Date of Patent: Mar. 19, 1985

[54] SUBMERSIBLE SIGNAL LAMP WITH INTERCHANGEABLE LENS ASSEMBLY

[76] Inventor: Dennis G. Moore, 2602 Superior, Livermore, County of Almeda, Calif. 94550

[21] Appl. No.: 534,336

[22] Filed: Sep. 21, 1983

[51] Int. Cl.³ .............................................. F21V 29/00
[52] U.S. Cl. ..................................... 362/267; 362/158; 362/296; 362/347; 362/280; 362/308; 362/375; 362/319; 362/328; 362/368
[58] Field of Search ................. 362/61, 158, 267, 296, 362/308, 310, 368, 440, 280, 319, 328, 347, 375

[56] References Cited

U.S. PATENT DOCUMENTS

| | | | |
|---|---|---|---|
| 2,866,082 | 12/1958 | Clayton et al. | 362/267 |
| 4,281,367 | 7/1981 | Moore et al. | 362/267 X |
| 4,293,847 | 10/1981 | McCarty | 362/267 X |
| 4,344,118 | 8/1982 | Rundquist et al. | 362/267 |
| 4,380,793 | 4/1983 | Potts | 362/267 |
| 4,384,316 | 5/1983 | de Vos et al. | 362/267 X |
| 4,394,716 | 7/1983 | Campagna et al. | 362/267 X |
| 4,399,497 | 8/1983 | Druffel | 362/368 X |

*Primary Examiner*—Peter A. Nelson
*Attorney, Agent, or Firm*—August E. Roehrig, Jr.

[57] ABSTRACT

A submersible lamp having a standardized air impervious housing with a lens formed therein in optical alignment with a bulb carried within the housing. The housing defines a predetermined quantity of air and has an opening at the lower end thereof such that upon submersion in water a limited amount of water is allowed to enter the housing, trapping the air within the housing and preventing the water from rising above a predetermined level. A channel is formed on the rear wall of the lamp housing to receive a bulb and bulb socket support bracket for the selective mounting and positioning of the bulb within the housing in accordance with the function which the lamp is to perform. The front and rear walls of the lamp housing are each formed with a guide against which a modular lens and reflector unit may be positioned which in combination with a positioning locator formed in the side walls of the lamp housing permit the modular lens and reflecting/refracting unit to be positioned at either side of the lamp housing to function as a rear signal lamp for either the left or right side of the vehicle. The bulb support bracket may be constructed with one or two bulbs for providing the additional function of a sidemarker or clearance lamp as desired.

8 Claims, 9 Drawing Figures

U.S. Patent  Mar. 19, 1985  Sheet 1 of 2  4,506,314
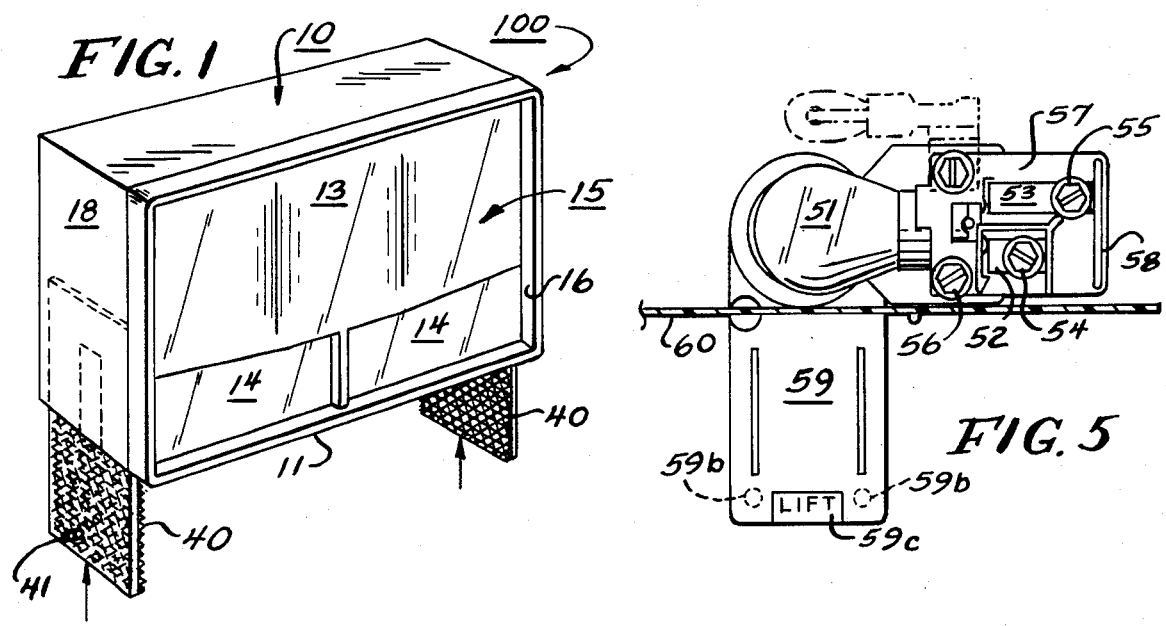
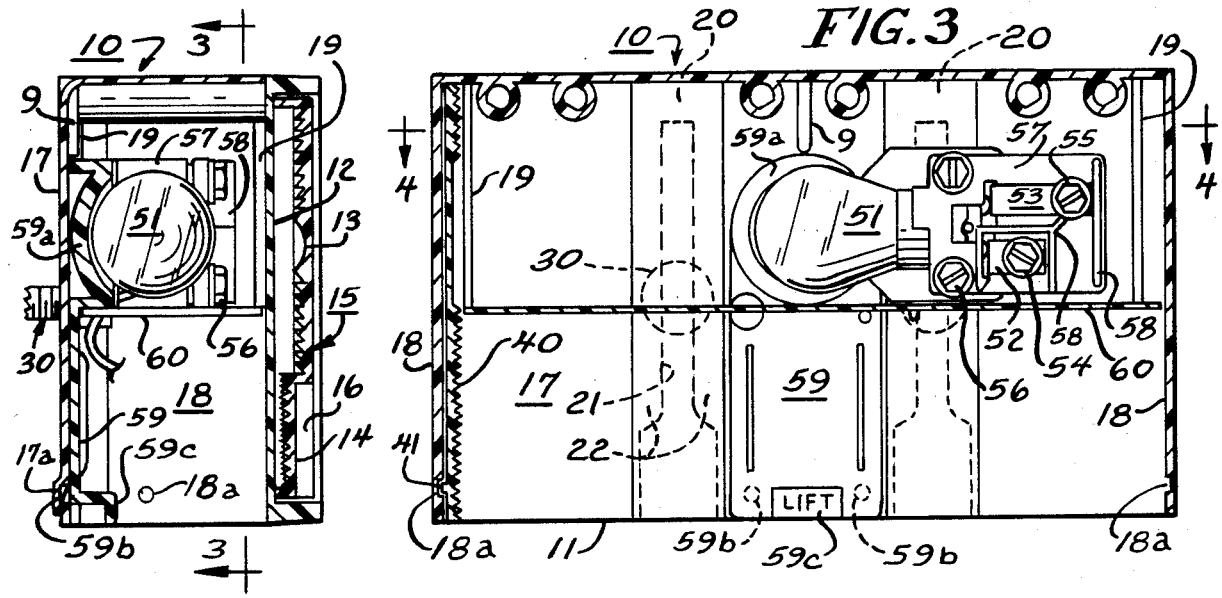
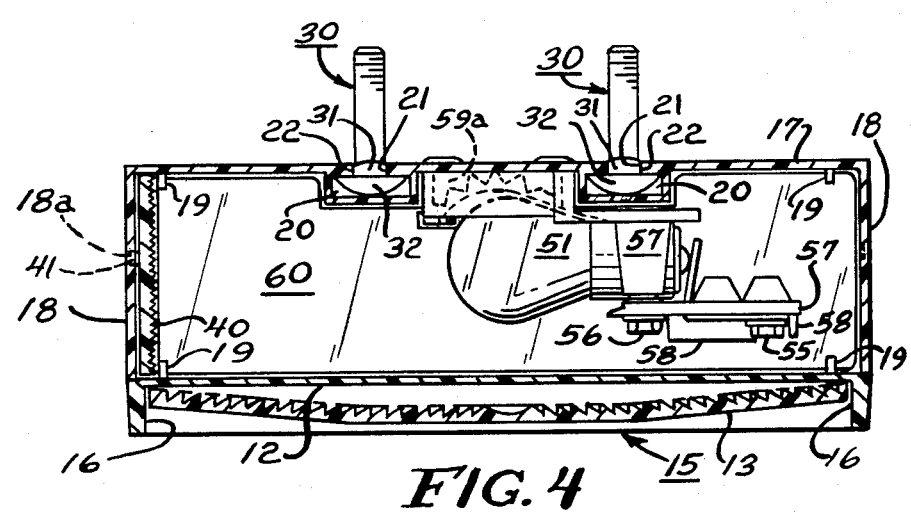

SUBMERSIBLE SIGNAL LAMP WITH INTERCHANGEABLE LENS ASSEMBLY

BACKGROUND OF THE INVENTION

This invention relates to vehicle lamps and, in particular, to a vehicle lamp especially adapted for use on boat trailers. More specifically, but without restriction to the particular use which is shown and described, this invention relates to a submersible lamp assembly which when submerged under water maintains the interior of the lamp dry preventing water from contacting an electric lamp and socket assembly positioned within the lamp housing causing corrosion and/or bulb breakage, and preventing degradation of lamp photometrics.

When a boat is launched or retrieved from the water, the boat trailer upon which the boat is carried must be maneuvered into the water a sufficient distance to launch or retrieve the boat. In so doing the rear signal lamps utilized on the boat trailer are submerged under water during this procedure, and frequently remain submerged under water for substantial periods of time while the boat is maneuvered into position and aligned with the trailer so that it may be winched on the trailer and removed from the water.

Until the invention of a lamp fixture which utilized an air trapping principle, such as disclosed in U.S. Pat. No. 3,106,349, and U.S. Pat. No. 3,858,039, prior attempts had been made to seal the lamp housing to prevent water from entering. Such "sealing" attempts were generally unsatisfactory, and led to the inventions described in the afore-mentioned patents, as well as that of U.S. Pat. No. 4,281,367. Boat trailer lamps which incorporated the inventions of these three patents, eliminated the problems of bulb and bulb socket corrosion, bulb breakage caused by thermal shock, provided convenient tool-less access to replace burned out bulbs, and prevented the terminal connections between the lamp and the trailer wiring from being subjected to rust and corrosion.

Such prior art submersible lamps solved these problems. However, once these problems were resolved the standardization of such vehicle lighting became desirable for boat trailer manufacturers. The present invention permits a single basic rear signal lamp housing to be used on either the right rear or left rear of a vehicle by interchanging a modular lens and reflector assembly, and by a bulb and socket support bracket within the standardized housing. The lamp of the preferred embodiment can also function as either a left or right sidemarker or clearance lamp by substitution of a readily insertable bulb slide so that the same lamp housing may be used on either side of the trailer for all trailer widths. However, if the bulb and bulb socket are oriented in a vertical direction, such as illustrated in U.S. Pat. No. 3,858,039, as an example, the same bulb slide supporting structure can be used in the standardized housing to mount the bulb and bulb socket for use on either side of the trailer.

SUMMARY OF THE INVENTION

It is, therefore, an object of the invention to improve vehicle lamps.

Another object of this invention is to improve vehicle lamps which are designed for submersion under water.

A further object of this invention is to maintain the integrity of the photometrics of a vehicle lamp after submersion under water by preventing the majority of light reflecting and refracting elements thereof from being degraded by moisture or water-borne contaminants accumulating on the light refracting and reflecting elements.

Yet another object of this invention is to enable a standard rear signal lamp housing to be used on either the right to left side of the vehicle, and to function as a rear signal lamp, sidemarker lamp, and clearance lamp as desired.

These and other objects are attained in accordance with the present invention wherein there is provided a submersible lamp having a standardized air impervious housing with a lens formed therein in optical alignment with a bulb carried within the housing for passing light therethrough. The housing defines a predetermined quantity of air and has an opening at the lower end thereof such that upon submersion in water a limited amount of water is allowed to enter the housing, trapping the air within the housing and preventing the water from rising above a predetermined level. A channel is formed on the rear wall of the lamp housing to receive a bulb and bulb socket support bracket for the selective mounting and positioning of the bulb within the housing in accordance with the function which the lamp is to perform. The front and rear walls of the lamp housing are each formed with a guide against which a modular lens and reflector unit may be positioned which in combination with a positioning locator formed in the side walls of the lamp housing permit the modular lens and reflecting/refracting unit to be positioned at either side of the lamp housing to function as a rear sidemarker signal lamp for either the left or right side of the vehicle. A second bulb may be added to the bulb support bracket for providing the additional function of a clearance lamp as desired.

DESCRIPTION OF THE DRAWINGS

Further objects of the invention, together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is a frontal perspective view of a submersible lamp housing and two modular lens/reflector units to illustrate how one or the other of such units may be inserted adjacent the lamp side wall to enable the signal lamp to function as either a left or right rear signal lamp as desired;

FIG. 2 is a cross sectional view of a lamp such as illustrated in FIG. 1 to better illustrate a bulb and bulb socket bracket positioned in optical alignment with the rear lens of the lamp housing and a left lens/reflector unit;

FIG. 3 is a sectional view of the lamp illustrated in FIG. 2 taken along lines 3—3;

FIG. 4 is a cross sectional view of the lamp illustrated in FIG. 3 taken along lines 4—4;

FIG. 5 is a frontal view of a bulb and bulb socket support bracket which is inserted into the lamp housing in optical alignment with the rear lens with a second bulb added in phantom to illustrate how the lamp can also function as a clearance lamp;

DESCRIPTION OF THE PREFERRED EMBODIMENT

Figures 6, 7:
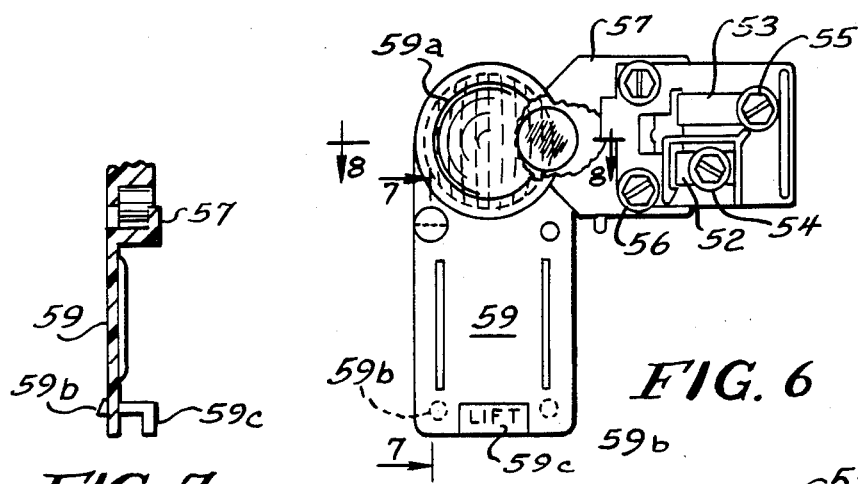
FIG. 6 is a view of the bulb and bulb socket support bracket shown in FIG. 5, with portions removed to better illustrate the construction thereof.
FIG. 7 is a partial sectional view of the bulb and bulb socket support bracket of FIG. 6 taken along lines 7—7.

Referring now to FIG. 1, there is shown a lamp assembly 100 including a lamp housing 10 formed from an air impervious material, with the lower portion or bottom of the housing having an opening 11 therein to permit the passage of air into the housing. In this manner the housing 10 defines an air chamber having a sufficient volume such that when the lamp assembly 100 is submerged in water, a limited amount of water enters the housing 10 through the opening 11 to trap and compress the air within the housing thereby creating a force sufficient to prevent the water from rising above a predetermined level. While the housing 10 has the bottom thereof entirely open, it is to be understood that any opening in the housing 10 sufficient to admit a limited amount of water into the housing for trapping and compressing air therein is a sufficient opening for purposes of this invention.

For convenience of illustration, the orientation of the lamp will be described in the manner one would view the lamp in use. Therefore, the portion of the lamp which is observed from a following vehicle is referred to as a front wall 12, even though light is directed therethrough in a rearwardly direction relative to the vehicle upon which the lamp is used.

The housing 10, best shown in detail in FIGS. 2-4, includes a unitary body of a transparent red plastic material, preferably made from LEXAN, a registered trademark of the General Electric Co., for an impact resistant plastic material. This housing has mounted thereon a lens and reflector assembly 15, comprising a lens 13 of a standard design for a rear vehicle signal lamp, and a rear reflector 14, mounted on the housing 10 such that substantially the entire front wall 12 of the lamp is covered by the lens and reflector. The front wall 12 is also recessed into the housing 10 forming a lip 16 about the periphery, such that upon insertion of the rear signal lamp lens and reflector assembly 15, therein the assembly 15 will be carried within the recessed portion and is fixedly secured thereto.

The rear wall 17 of the lamp housing 10 is formed with a pair of grooves 20 each for receiving a mounting bolt 30 used for securing the lamp 100 to a vehicle. The carriage bolts 30 preferably have a shoulder portion 31 formed thereon, so that the head 32 of the bolt may be inserted into the groove 20 and the bolt slid therealong passing through the groove 20 until the shoulder 31 portion engages a reduced opening 21 of the groove, preventing the bolt from rotating and retaining the bolt head 32 within the groove between overhanging portions 22. In this manner the bolt 30 can be positioned anywhere along the length of the undercut defined by the overhanging portions 22 to provide suitable vertical adjustment of the signal lamp relative to the trailer frame to which it is secured.

Each of the vertically extending side walls 18 of the lamp housing 10 form a transparent red plastic window. In this manner, a lens and reflecting/refracting module 40, made entirely clear, if desired, may be positioned within the housing adjacent to or in contact with the inner portion of the side wall 18, thereby creating a sidemarker lens and reflector for the housing. To this end, guides 19 are formed in or secured to both the front 12 and rear 17 walls of the housing parallel to each side wall and spaced therefrom. Upon insertion of the lens and reflecting/refracting module 40 into the housing 10, the module will be guided and held in position adjacent to the side wall 18 so that light passing out from the interior of the housing through the lens and reflecting/refracting module unit 40, and the side wall 18, will photometrically appear as a lens and reflecting/refracting unit which heretofore had been molded into or fixedly secured to a lamp housing. While FIG. 1 illustrates two such modules 40 to better illustrate how the lamp housing 10 may be used for either a left or right rear signal lamp, it is to be understood that in use only one of such modules 40 is normally installed within the housing 10, unless used on a vehicle requiring only rear signal lamp such as a motorcycle.

A pair of protrusions 41 are formed on each of the lens and reflecting/refracting modules 40 to retain these units in position against the adjacent side wall 18. A pair of complementary recesses 18a are formed in each side wall 18 to retain the lens and reflecting/refracting module 40 in position against the adjacent side wall 18. The protrusion 41 for the right and left module are located at different positions and insure that the proper left or right unit is used for the desired left or right function of the signal lamp.

Figure 8:
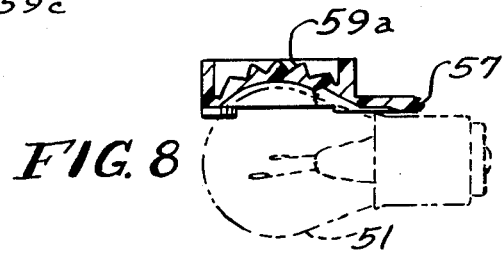
FIG. 8 is a partial sectional view of the bracket shown in FIG. 6, taken along lines 8—8.
Figure 9:
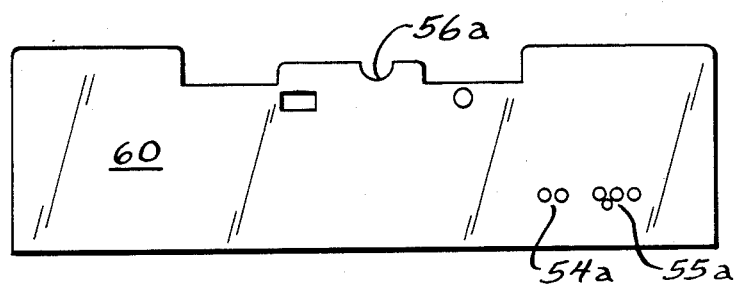
FIG. 9 is a horizontal view of a clear or transparent dust guard which is carried within the lamp housing and functions to prevent dust or debris from accumulating within the lamp housing while allowing light to pass downwardly therethrough.

Referring also to FIGS. 5-9, there is illustrated a bulb and bulb socket bracket 50, also referred to as a bulb slide, and portions thereof. The bulb slide 50 is utilized to provide convenient access for replacement of a bulb 50 utilized to illuminate the signal lamp, without the necessity of requiring any tools to replace a burned out bulb. While the unit illustrated is for a lamp housing to be utilized as a left rear signal lamp, it is to be understood that the construction of the bulb slide 50 would be identical for a right rear signal lamp, except that the bulb 51 and attendant electrical fixtures and mounting structure would be a mirror image, about a vertical axis, with the bulb 51 pointing to the right side as opposed to the left as shown in the drawings. The attendant physical supporting structure and electrical couplings would therefore be on the left side of the central portion for a right rear unit.

In addition, it is to be understood that a second bulb may be incorporated on the bulb slide, for example, in the manner illustrated in phantom in FIG. 5, so that the rear signal lamp can also perform the function of a clearance lamp when mounted toward the outward extremities of a trailer over 80 inches in width or if an additional illumination of the sidemarker, if required. Without the addition of a second bulb, the signal lamp, as illustrated, by federal regulations cannot be used on vehicles over 80 inches in width unless separate clearance lamps are also installed on the vehicle.

Referring now to the bulb slide 50, the bulb 51 is carried thereon, and connected by suitable electrical conductors 52 and 53 to terminals 54 and 55 which, respectively, are utilized in connecting to the brake/turn signals and tail lamps circuits. A ground connection is coupled by a suitable lead to a terminal 56 for connection to the trailer frame for grounding purposes. The terminal connections 54, 55, and 56 are carried on an electrically insulating plastic support bracket 57 with guides 58 formed thereabout to facilitate guiding the insertions of electrical wire leads to these respective terminals. In this manner the leads from a trailer wiring harness, not shown, may be connected to the lamp terminals 54 and 55 in a position within the lamp housing 10 which will be above the water level when the lamp 100 is submerged under water. Therefore, the terminal connections, as well as the lamp bulb 51 will at all times be free from contact with the water, preventing corrosion of the electrical components and breakage of the glass bulb due to thermal shock.

The bulb 51, terminal connections 54, 55 and 56, and bracket 57 are carried on a central support bracket 59 which has formed at an upper end thereof a reflector portion 59a positioned behind the bulb 51 to reflect and direct the light rays from the bulb in a predetermined outward manner without using reflective material. The central support bracket 59 also supports a transparent plastic dust shield 60 which extends throughout the open area between the walls of the lamp to prevent dust, dirt, or debris from entering into the interior of the lamp housing. The dust shield 60 has a series of small wire-size openings 54a, 55a, and 56a formed therein through which the leads from the trailer wiring harness may be passed for connection to terminals 54, 55, and 56.

The central support bracket 59 is positioned and secured within the lamp housing 10 by being inserted through the bottom opening 11 against the rear wall 17 and between the interior edges of the two grooved portions 20. These interior edges of the groove portions function as a guide while the bracket 59 is being inserted, and to hold the bulb slide 50 in the proper position. A stop 9 is formed at the top of the interior of the lamp housing 10 to limit the upward vertical movement of the bulb slide, and a pair of recesses 17a are formed in the inner face of the rear wall 17 to receive a pair of complementary protrusions 59b—formed at the lower end of the bracket 59—on the side thereof adjacent to the rear wall. Upon insertion of the bulb slide 50 into the lamp housing, the bulb 51 will be maintained in the proper desired position, and cannot be removed until the protrusions 59b are disengaged from the recesses 17a.

To facilitate removal of the bulb slide 50 a pull or lift portion 59c is provided on the central support bracket 59 to enable it to be grasped and lifted outwardly. When the protrusions 59b are free of the recesses 17a, the bulb slide 50 may be slid downward from the interior of the lamp housing for changing a burned out bulb, or to utilize the light as a source of illumination for doing repair work such as replacing a flat tire on the trailer.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment illustrated and described as the best mode presently contemplated for carrying out this invention, but that the invention will include many embodiments falling within the scope of the appended claims.

What is claimed is:

1. In a submersible electric lamp having an air impervious housing defining an enclosure for retaining a predetermined volume of air, and having an opening through which a limited amount of water may pass into the housing upon submersion of the housing in water to a level below said opening thereby trapping the air within the housing and creating a force sufficient to prevent the water from rising above a predetermined level, and an electric lamp carried within said housing above said predetermined level, the improvement comprising retaining means within said housing for selectively retaining a lens and reflector module inserted within said housing in optical alignment with said electric lamp, and at least one lens and reflector module selectively insertable into engagement with said retaining means in said housing for positioning said lens and reflector module in optical alignment with said electric lamp.

2. The submersible electrical lamp of claim 1 wherein said air impervious housing includes a front wall, a rear wall, and a pair of transparent side walls, and said retaining means is carried by said front wall and said rear wall adjacent to each of said side walls.

3. The submersible electric lamp defined by claim 2 wherein said lens and reflector module is positionable adjacent one of said transparent side walls.

4. The submersible electric lamp defined by claim 3 further including a locating means formed on said lens and reflector module for positioning said lens and reflector module mutually exclusively adjacent to only one of said transparent side walls.

5. The submersible electric lamp defined by claim 4 further including a rear signal lamp lens and reflector assembly carried by said air impervious housing adjacent to and secured with the front wall thereof.

6. The submersible electric lamp defined by claim 1 wherein said electric lamp carried within said air impervious housing is supported on a bulb slide insertable through the opening in said housing.

7. The submersible electric lamp defined by claim 6 wherein said bulb slide includes a reflector portion positioned between the bulb and rear wall of the lamp housing to reflect the light radiating therefrom through the forward wall of said housing.

8. The submersible electric lamp defined by claim 6 which said electric lamp supported on said bulb slide is positioned in optical alignment with said lens and reflector module to direct light therethrough.

* * * * *